United States Patent [19]
Spatafora et al.

[11] Patent Number: 5,755,907
[45] Date of Patent: May 26, 1998

[54] METHOD AND UNIT FOR LONGITUDINALLY SEALING TUBULAR WRAPPINGS

[75] Inventors: Mario Spatafora, Bologna; Andrea Berti, Castel San Pietro Terme, both of Italy

[73] Assignee: Azionaria Costruzioni Macchine Automatiche A.C.M.A. S.p.A., Bologna, Italy

[21] Appl. No.: 644,984

[22] Filed: May 9, 1996

[51] Int. Cl.⁶ .............................. B31C 1/00; B29C 53/56
[52] U.S. Cl. .............. 156/218; 156/272.4; 156/275.1; 156/448; 156/380.1; 493/306
[58] Field of Search .................... 156/218, 272.4, 156/274.4, 275.1, 439, 458, 446, 448–450, 203, 380.1, 583.4; 493/305, 306, 303

[56] References Cited

U.S. PATENT DOCUMENTS 4,310,369  1/1982  Miller ........................ 493/306
5,024,046  6/1991  Spatafora ..................... 53/466

FOREIGN PATENT DOCUMENTS 2484387  12/1981  France .
2229156   9/1990  United Kingdom .
2229157   9/1990  United Kingdom .
2231317  11/1990  United Kingdom .

Primary Examiner—Michael W. Ball
Assistant Examiner—Michael A. Tolin
Attorney, Agent, or Firm—Ladas & Parry

[57] ABSTRACT

Tubular wrappings, formed from a sheet with superimposed longitudinal lateral portions and made of partly metal and partly heat-sealable material, are sealed longitudinally by successively feeding the wrappings, by means of a conveyor, in a first given direction and along a given path through a sealing station; by varying the traveling speed of the wrappings in relation to the conveyor so as to successively impart to the wrappings a pause at the sealing station; and by induction heating, for an adjustable length of time during the relative pause, the metal part of the sheet of each wrapping along the relative superimposed longitudinal lateral portions, to melt the heat-sealable part of the sheet.

3 Claims, 2 Drawing Sheets

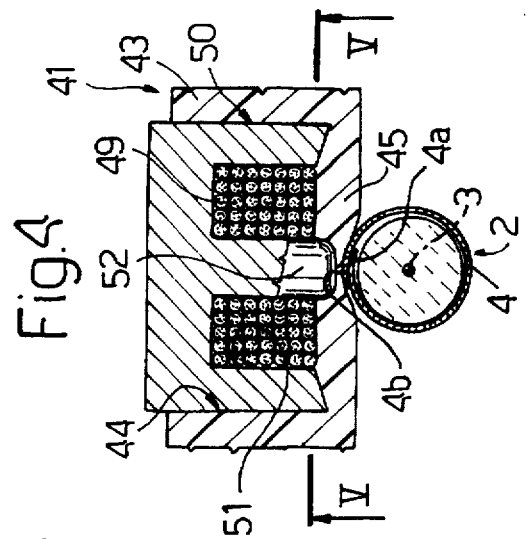
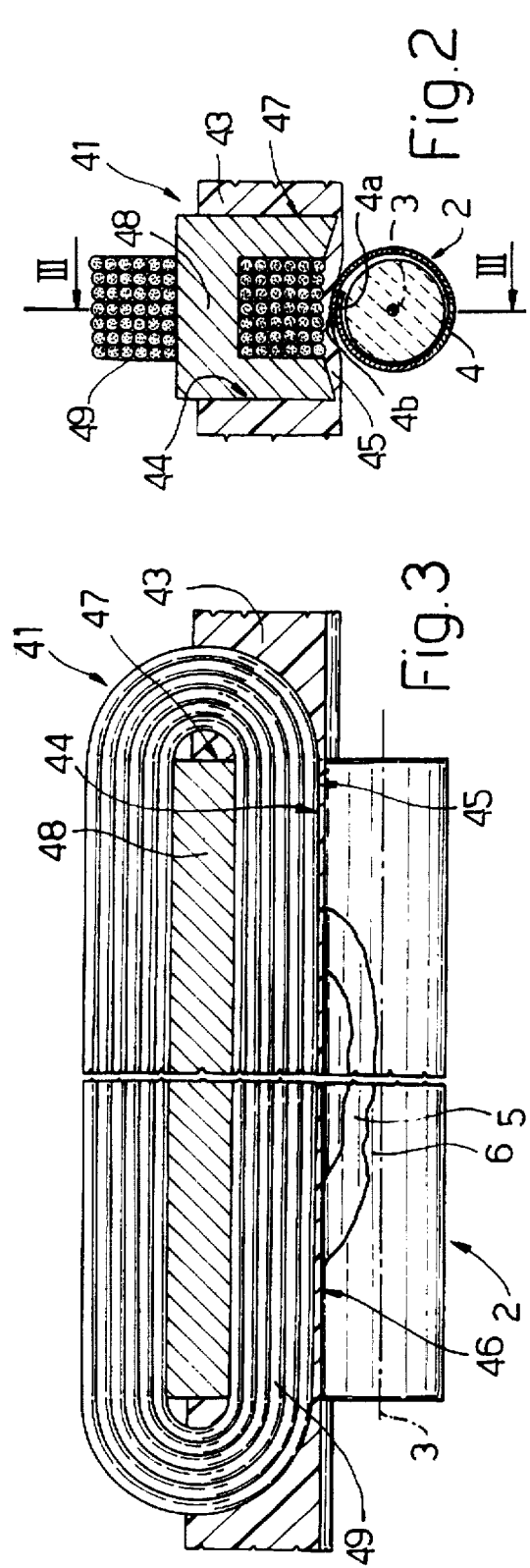
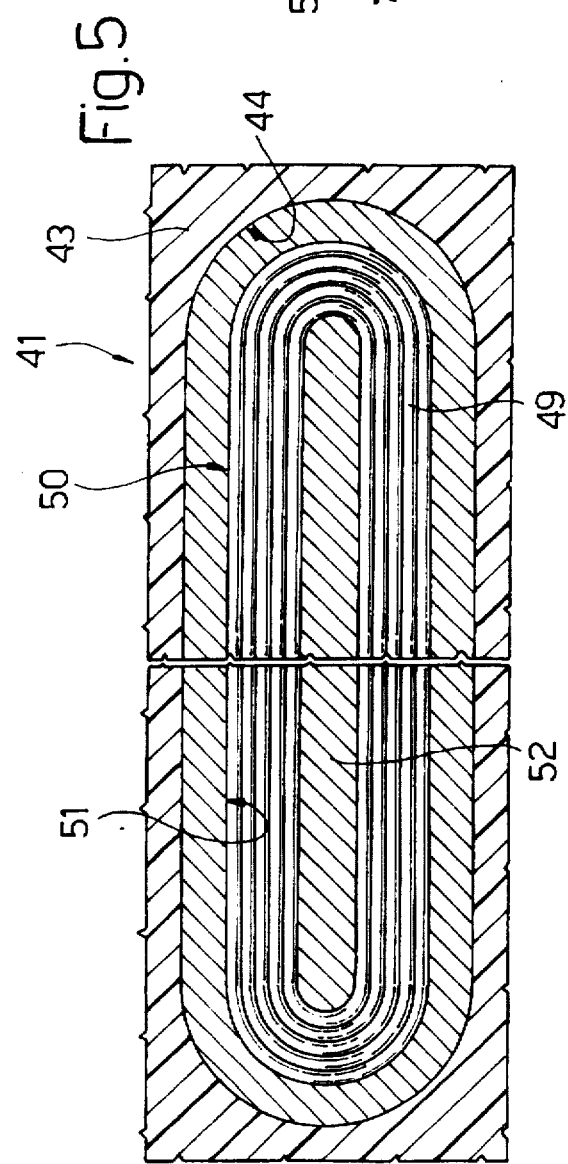

METHOD AND UNIT FOR LONGITUDINALLY SEALING TUBULAR WRAPPINGS

BACKGROUND OF THE INVENTION

The present invention relates to a method of longitudinally sealing tubular wrappings.

More specifically, the present invention relates to a straightforward, effective method of longitudinally sealing tubular wrappings fed by a continuous conveyor along a given path and formed from a sheet of wrapping material comprising a metal portion and a heat-sealable portion.

The present invention may be applied to advantage in the food industry, for longitudinally sealing elongated, not necessarily cylindrical, wrappings on continuous wrapping machines, to which the following description refers purely by way of example.

SUMMARY OF THE INVENTION

According to the present invention, there is provided a method of longitudinally sealing tubular wrappings comprising a sheet wound into a loop with its longitudinal lateral portions superimposed one on top of the other; the sheet being made of material presenting a metal portion and a heat-sealable portion; and the method comprising the step of feeding the wrappings successively, by means of a continuous conveyor, in a first given direction and along a given path through a longitudinal-sealing station; the method being characterized by also comprising the further steps of varying the traveling speed of the wrappings in relation to the conveyor so as to successively impart to the wrappings a pause at the sealing station; and induction heating, for a given length of time during the relative pause, the metal portion of the sheet of each wrapping along the relative superimposed longitudinal portions to melt the heat-sealable portion of the sheet and join said superimposed longitudinal portions to each other.

According to a preferred embodiment of the above method, said metal portion of the sheet is heated by electromagnetic induction.

Preferably, said metal portion of said sheet is heated by electromagnetic induction by means of an induction sealing head located at said sealing station; each wrapping being moved, at said sealing station, to and from said sealing head in a substantially radial direction in relation to said path.

According to one embodiment of the above method, the wrappings are fed along said path by a drum conveyor rotating at substantially constant speed about its axis, and presenting oscillating grippers, each of which feeds a respective wrapping crosswise in relation to the longitudinal axis of the wrapping; said variation in the traveling speed of the wrappings in relation to the conveyor being achieved by so oscillating the relative said grippers that, at the sealing station, the wrappings travel along a trajectory extending in a second substantially radial direction in relation to said drum conveyor.

The present invention also relates to a unit for longitudinally sealing elongated wrappings.

According to the present invention, there is provided a unit for longitudinally sealing tubular wrappings comprising a sheet wound into a loop with its longitudinal lateral portions superimposed one on top of the other; the sheet being made of material presenting a metal portion and a heat-sealable portion; and the unit comprising a continuous conveyor for feeding the wrappings successively in a first given direction and along a given path; and a longitudinal-sealing station located along said path; the unit being characterized by also comprising speed varying means connecting each said wrapping to the conveyor and for varying the traveling speed of the wrappings in relation to the conveyor so as to successively impart to the wrappings a pause at the sealing station; and heating means located at said sealing station, and cooperating solely with said metal portion of each wrapping, to heat the metal portion for a given length of time during the relative said pause and along the superimposed longitudinal portions of the relative sheet, and so melt the heat-sealable portion of the sheet to join said superimposed longitudinal portions to each other.

According to a preferred embodiment of the above unit, said heating means are electromagnetic-induction heating means.

Preferably, said heating means comprise an induction sealing head, and said conveyor is a drum conveyor rotating at substantially constant speed about its axis; said speed varying means comprising, for each said wrapping, an oscillating gripper for feeding a respective wrapping crosswise to the longitudinal axis of the wrapping, and second actuating means interposed between the drum conveyor and said gripper, and for so oscillating the gripper that, in use, the relative wrapping is moved, at the sealing station, to and from the sealing head along a trajectory extending in a second substantially radial direction in relation to said drum conveyor.

BRIEF DESCRIPTION OF THE DRAWINGS

A number of non-limiting embodiments of the present invention will be described by way of example with reference to the accompanying drawings, in which:

FIG. 2 shows a larger-scale view of a detail in FIG. 1;

FIG. 3 shows a section along line III—III in FIG. 2;

FIG. 4 shows a larger-scale view of a variation of the FIG. 2 detail;

FIG. 5 shows a section along line V—V in FIG. 4.

DETAILED DESCRIPTION OF THE INVENTION

Figure 1:
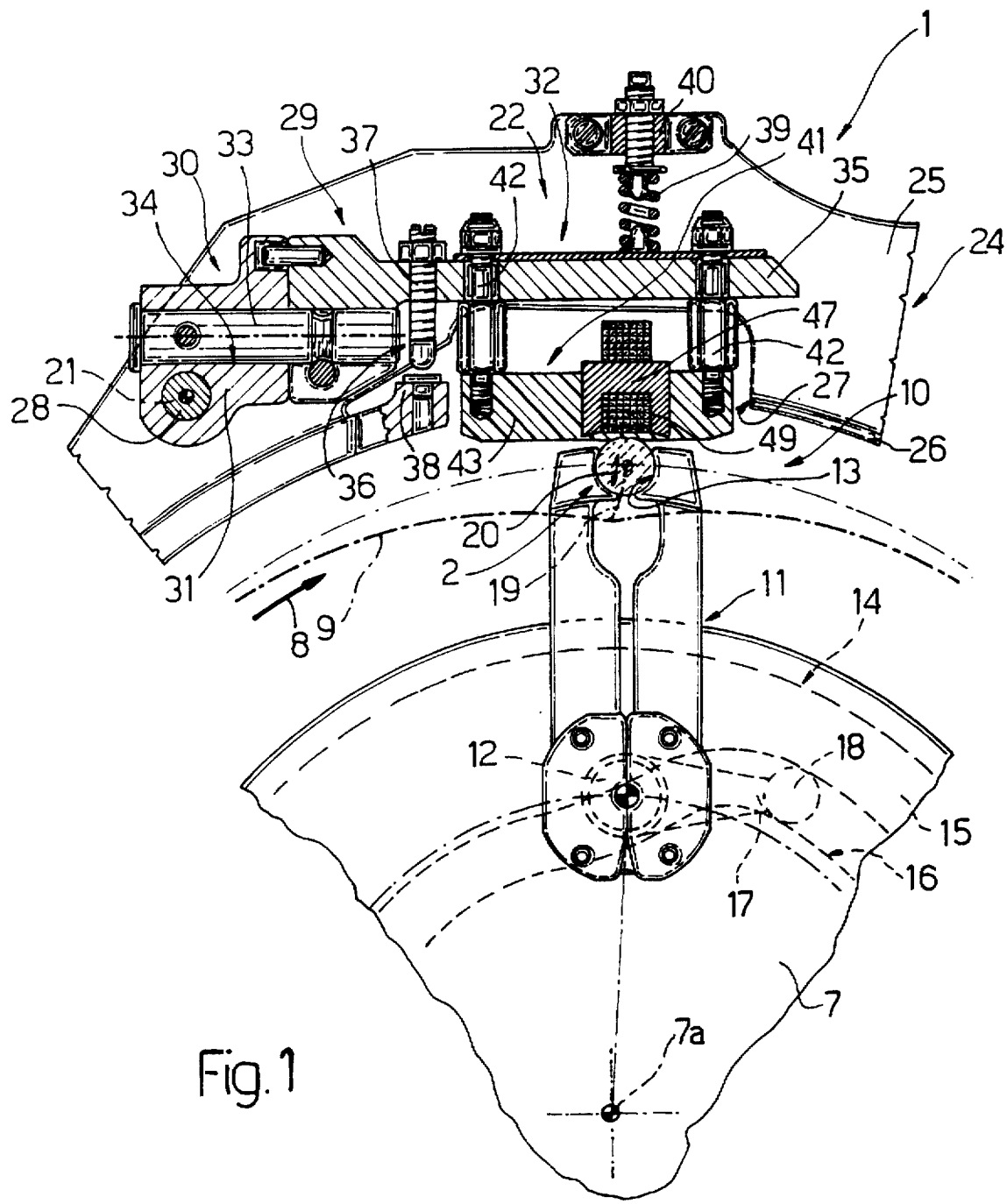
FIG. 1 shows a schematic side view, with parts in section and parts removed for clarity, of a preferred embodiment of the sealing unit according to the present invention.

With reference to FIGS. 1 and 2, number 1 indicates a unit for longitudinally sealing elongated, normally but not necessarily cylindrical, wrappings 2 presenting a longitudinal axis 3 and formed by winding a sheet 4 of wrapping material into a loop about axis 3 so that the opposite lateral portions 4a and 4b of sheet 4 are superimposed one on top of the other. Sheet 4 is made of material comprising a metal portion and a heat-sealable portion, which may either be blended or, as in the example shown, define a metal layer 5, preferably comprising foil, and a cover layer 6 of heat-sealable material, preferably comprising lacquer (FIG. 3).

Unit 1 comprises a conveyor drum 7 rotating at substantially constant angular speed about its axis 7a to successively feed wrappings 2 in a given direction 8 and along an annular path 9 extending through a sealing station 10 where wrappings 2 are longitudinally sealed along superimposed portions 4a, 4b of respective sheets 4.

As shown more clearly in FIG. 1, drum 7 comprises a number of grippers 11 (only one shown) connected in rotary manner to drum 7 by means of respective pins 12 parallel to axis 7a and equally spaced about a circumference coaxial with axis 7a. At the free end opposite that connected to respective pin 12, each gripper 11 defines a seat 13 for receiving a respective wrapping 2 with its axis 3 parallel to axis 7a, and forms part of a speed varying device 14 comprising a fixed cam 15 with an annular face groove 16 extending about axis 7a. Device 14 also comprises, for each gripper 11, a lateral lever 17 integral with gripper 11 and supporting, on its free end located a given distance from respective pin 12, a tappet roller 18 rotating, in relation to lever 17, about its own axis parallel to axis 7a, and engaged in rolling manner inside groove 16.

As shown in FIG. 1, to maintain grippers 11 in a substantially radial position in relation to drum 7, groove 16 is substantially circular, except for a portion in the region of station 10 where groove 16 is so shaped as to first rotate each gripper 11 about pin 12 in the same direction as drum 7 about axis 7a, and then rapidly rotate each gripper 11 in the opposite direction to drum 7, so as to cause, for a given length of time at station 10, a pause in the movement of seat 13 in direction 8. Since pin 12 of each gripper 11 continues to rotate continuously about axis 7a even during the pause of respective seat 13, this, during the pause, acts as a link which travels back and forth along a trajectory 19 extending outwards from path 9 in a direction 20 substantially perpendicular to direction 8 at station 10. In practice, trajectory 19 extends along an arc, the axis 21 of which is parallel to axis 7a and located outside the circle defined by path 9.

At station 10, drum 7 cooperates with heating means 22 forming a longitudinal-sealing device 22 which, as shown more clearly in FIG. 2, cooperates with superimposed portions 4a, 4b of sheet 4 of wrapping 2 to longitudinally seal the wrapping.

Device 22 comprises a fixed support 24 located outwards of the outer periphery of drum 7 and in turn comprising a plate 25 perpendicular to axis 7a and presenting, on the side facing the periphery of drum 7, a flange 26 presenting a window 27 at station 10. Plate 25 supports a pin 28 coaxial with axis 21 and defining the pivot of a movable sealing element 29 comprising a lever 30 oscillating about axis 21. Lever 30 comprises a connecting block 31 mounted for rotation on pin 28; and a rod 32 defined, at one end, by an axial pin 33 snap-locked inside a hole 34 formed through block 31 crosswise to axis 21, and, at the other end, by a plate 35 perpendicular to plate 25 and extending in front of window 27 and on the opposite side of window 27 in relation to drum 7.

Lever 30 presents a travel limiting device 36 comprising a pin 37 extending from plate 35 towards flange 26 and which cooperates with a supporting element 38 on flange 26 by virtue of a reaction spring 39 compressed between plate 35 and a bracket 40 fitted to plate 25.

In addition to lever 30, sealing element 29 also comprises an induction sealing head 41 fitted through window 27 and suspended to plate 35 by two ties 42 of adjustable length. Head 41 comprises a block 43 connected to ties 42 and presenting, on the side facing plate 35, an elongated groove 44 with a longitudinal axis parallel to axis 7a. On the side facing path 9, groove 44 is closed by a relatively thin bottom wall 45, the surface of which facing path 9 presents an elongated seat 46 parallel to axis 7a and for receiving a wrapping 2.

Groove 44 houses a ferrite body 47 presenting a substantially U-shaped section with its concavity facing wall 45, and which comprises a core 48 extending parallel to wall 45 and forming the inner core of an inductive winding 49, one portion of which extends inside groove 44, between core 48 and wall 45, and another portion of which extends outside groove 44. Winding 49 is connected in known manner (not shown) to the mains by a central control unit (not shown) for controlling the passage and frequency of the current through winding 49.

In the variation shown in FIGS. 4 and 5, groove 44, in horizontal section, is substantially rectangular with rounded ends, and houses a block 50 of ferrite, the surface of which facing wall 45 presents an annular groove 51 defining an inner core 52 parallel to axis 7a, and housing winding 49 which, in this case, is housed entirely inside groove 44.

In actual use, whenever a wrapping 2 is fed into station 10, said central control unit (not shown) connected to winding 49 activates head 41 to supply a given current through winding 49 and generate, in station 10, a variable magnetic field capable of inducing, in layer 5 of wrapping 2 in station 10, currents by which to heat layer 5, melt the heat-sealable material of layer 6 at superimposed portions 4a, 4b of sheet 4, and subsequently seal wrapping 2 longitudinally.

To ensure optimum sealing, travel limiting device 36 normally maintains head 41 in such a position that each wrapping 2, as it moves along trajectory 19 in station 10, engages seat 46 before reaching the peak of trajectory 19, raises movable sealing element 29 by a given amount in opposition to spring 39, and remains in contact with wall 45 long enough to temporarily melt the material of layer 6.

Naturally, the length of time each wrapping 2 contacts head 41 may be adjusted by appropriately adjusting the position of pin 37 in relation to lever 30.

We claim:

1. In a method of longitudinally sealing tubular wrappings (2), each of the wrappings (2) comprising a sheet (4) wound into a loop with a metal portion (5) and a heat-sealable portion (6) of longitudinal lateral portions (4a, 4b) superimposed on each other, the improvements of the method comprising the steps of:

feeding the wrappings (2) successively with a continuous conveyor (7) in a first direction (8) along a path (9) through a longitudinal-sealing station (10) comprising an induction sealing head (41) movable in a second direction (20) substantially perpendicular to the path (9) against means for elastic action (39);

varying a traveling speed of the wrappings (2) in relation to a speed of the continuous conveyor (7) so as to successively impart to the wrappings (2) a pause at the sealing station (10);

moving at the sealing station (10) each of the wrappings (2) and, in the second direction (20), the induction sealing head (41) so as to bring the superimposed longitudinal lateral portions (4a, 4b) into contact with the induction sealing head (41); and induction heating, for a length of time during the pause, the metal portion (5) of the sheet (4) of each of the wrappings (2) to melt the heat-sealable portion (6) of the sheet (4) and join the superimposed longitudinal portions (4a, 4b) to each other.

2. The method as claimed in claim 1, wherein the induction heating is electromagnetic induction heating.

3. The method as claimed in claim 1, wherein:

the continuous conveyor (7) is a drum conveyor (7) rotating a substantially constant speed about an axis (7a) and having oscillating grippers (11) for respectively feeding the wrappings (2) crosswise in relation to a longitudinal axis (3) thereof; and the varying in the speed of the wrappings (2) is achieved by so oscillating the grippers (11) that, at the sealing station (10), the wrappings (2) travel along a trajectory (19) extending in the second direction (20) substantially radial in relation to the drum conveyor (7).

* * * * *

UNITED STATES PATENT AND TRADEMARK OFFICE
CERTIFICATE OF CORRECTION

PATENT NO.   :   5,755,907
DATED        :   May 26, 1998
INVENTOR(S)  :   Mario SPATAFORA, et al.

It is certified that error appears in the above-indentified patent and that said Letters Patent is hereby corrected as shown below:

```
On title page, insert -- [30] Foreign Application
Priority Date May 10, 1995 [It] Italy BO 95A 000212 --
```

Signed and Sealed this

Twenty-second Day of December, 1998

Attest:

BRUCE LEHMAN

Attesting Officer

Commissioner of Patents and Trademarks